United States Patent [19]

Mandai et al.

[11] 4,323,617
[45] Apr. 6, 1982

[54] SEMICONDUCTOR CERAMIC COMPOSITION FOR BOUNDARY LAYER CAPACITORS

[75] Inventors: Harufumi Mandai; Kunitaro Nishimura, both of Nagaokakyo, Japan

[73] Assignee: Murata Manufacturing Co., Ltd., Kyoto, Japan

[21] Appl. No.: 165,666

[22] Filed: Jul. 3, 1980

Related U.S. Application Data

[63] Continuation of Ser. No. 942,690, Sep. 15, 1978, abandoned.

[30] Foreign Application Priority Data

Sep. 16, 1977 [JP] Japan .................................. 52/111807
Sep. 16, 1977 [JP] Japan .................................. 52/111808

[51] Int. Cl.$^3$ ........................ B32B 5/04; B32B 15/16; C04B 35/46
[52] U.S. Cl. ............................ 428/148; 252/62.3 BT; 357/61; 428/409; 428/472; 501/123; 501/136

[58] Field of Search ............................ 106/73.3, 73.31; 252/62.3 BT, 520, 521; 357/61; 428/148, 409, 432–434, 472

[56] References Cited

U.S. PATENT DOCUMENTS 3,426,251   2/1969   Prokopowicz .................. 252/520 X Primary Examiner—Bruce H. Hess
Attorney, Agent, or Firm—Birch, Stewart, Kolasch & Birch

[57] ABSTRACT

A semiconductor ceramic composition for boundary layer capacitors which consists essentially of 99.6 to 99.995 wt. % of a semiconductor ceramic component consisting of strontium titanate or modified strontium titanate solid solution and at least one semiconductorizing agent, and 0.005 to 0.1 wt. % of phosphorus together with or without 0.015 to 0.3 wt. % of copper is disclosed. The composition makes it possible to produce boundary layer capacitors having high permittivity and high breakdown voltage at high percent non-defective.

4 Claims, No Drawings

SEMICONDUCTOR CERAMIC COMPOSITION FOR BOUNDARY LAYER CAPACITORS

This application is a continuation of copending application Ser. No. 942,690, filed on Sept. 15, 1978 now abandoned.

BACKGROUND OF THE INVENTION

This invention relates to semiconductor ceramic compositions for boundary layer capacitors. More particularly, it relates to semiconductor ceramic compositions which make it possible to produce boundary layer ceramic capacitors having high permittivity and high breakdown voltage characteristic at high percent non-defective.

It has been known that ceramic capacitors of a boundary layer type are made by forming an insulating layer on grain surfaces of crystals of strontium titanate semiconductor ceramics. These boundary layer ceramic capacitors have widely been used because of their large apparent permittivity, small temperature coefficient of permittivity and, small dielectric loss.

In order to produce boundary layer ceramic capacitors having large apparent permittivity, it is necessary to fire ceramic materials so that the crystals of the semiconductor ceramic will have a grain size ranging from $50\mu$ to $100\mu$. For this reason, the ceramic materials are required to be fired in a neutral or reducing atmosphere during the firing process. Usually, increasing grain size of crystals and, increasing the reducing action of the atmosphere tends to increase partial welding of ceramic disks, which are piled, during the firing process. This can be inhibited by adding zirconia powder between piled ceramic disks. Even under such a condition, it is difficult with the conventional composition to produce semiconductor ceramic disks which do not weld together, and the percent non-defective thereof is about 70%. Thus, it is necessary to separate welded disks into individuals, resulting in the increase of the cost of ceramic capacitors.

It is therefore a main object of the present inventon to provide a semiconductor ceramic composition for boundary layer capacitors which makes it possible to produce boundary layer capacitors having high permittivity and high breakdown voltage characteristic at high percent non-defective.

According to the present invention, there is provided a semiconductor ceramic composition for boundary a semiconductor ceramic composition for boundary layer capacitors consisting essentially of 99.90 99.995 wt % of a semiconductor ceramic component consisting of strontium titanate or a modified strontium titanate solid solution and at least one semiconductorizing agent, and 0.005 to 0.1 wt % of phosphorus.

The above composition may further contain 0.015 to 0.3 wt % of copper. In such a case, a semiconductor ceramic composition of the present invention consists essentially of 99.6 to 99.98 wt % of a semiconductor ceramic component consisting of strontium titanate or a modified strontium titanate solid solution and at least one semiconductorizing agent, 0.005 to 0.1 wt % of phosphorus, and 0.015 to 0.3 wt % of copper.

In this specification, the strontium titanate or a modified strontium titanate solid solution means a solid solution having a composition expressed by the general formula:

wherein A is Ba or Ca, x and y are mole fractions of the respective components and take respective values in the following range. $0 \leq x \leq 0.20$, $0 \leq y \leq 0.20$ At least one semiconductorizing agent, or doping element may be selected from the group consisting of Sb, Ta, Nb, W, Y, La, and rare earth elements. The semiconductorizing agent is incorporated into the strontium titanate or modified strontium titanate solid solution in an amount not more than 5 wt %. If the content of the semiconductorizing agent is more than 5 wt %, the resistivity of the ceramic is considerably increased, thus making it difficult to semiconducterize the ceramics.

Phosphorus contributes to prevent welding of ceramics during the firing process when it is contained in the ceramics in an amount within the range of 0.005 to 0.1 wt %. If the content of phosphorus is less than 0.005 wt % or more than 0.1 wt %, its effect is scarcely obtained.

Copper contributes to increase the breakdown voltage of the produced boundary layer capacitors when it is contained in the ceramics in an amount within the range of 0.015 to 0.3 wt %. If the content of copper is out of the above range, it is difficult to increase the breakdown voltage of the boundary layer capacitors.

According to the present invention, it is possible to produce boundary layer ceramic capacitors without welding of semiconductor ceramic disks during the firing in a neutral or reducing atmosphere.

When producing boundary layer capacitors, grain boundaries of crystals of the semiconductor ceramics are converted to the insulating state by heat-treating in an oxidizing atmosphere at a temperature of 1000 to 1300° C. after applying paste containing at least one metal or metal oxide to the surfaces of the semiconductor ceramic disks. As at least one metal or metal oxide for converting the grain boundary of crystal to an insulating layer, there may be used those such as V, Cr, Mn, Fe, Co, Ni, As, Sb, Tl, Bi and their oxides. These metals or oxides diffuse into the semiconductor ceramic crystal by the heat-treatment. The proper amount of these metal or oxides to be applied to the semiconductor disk depends on their kind, but they enable the product to have a constant dielectric characteristics when applied in an amount of 1 to 4 wt % with respect to the weight of semiconductor ceramics. If the amount of these metal or oxides is out of the above range, the insulating resistance of the product is lowered and the dielectric loss is increased. As a method for applying the metal or its oxide to the surface of the respective disk, there may be employed a coating method, diping method, spray method, vapour deposition method and the like.

The present invention will be further apparent from the following description with respect to the examples.

EXAMPLES

Using SrTiO$_3$, BaTiO$_3$, CaTiO$_3$, BaZrO$_3$, Y$_2$O$_3$, WO$_3$, Ce$_2$O$_3$, Sr$_3$(PO$_4$)$_2$ and Cu$_3$(PO$_4$)$_2$ as raw materials, there are prepared mixtures to produce semiconductor ceramics each having a composition as shown in Table 1. Each mixture is milled in a ball mill by the wet process for 10 hours to obtain a fully uniform or homogeneous composition. After the mixture is dried, 10 wt % of polyvinyl acetate resin is added as a binder, and grained so as to have a grain size of about 50 mesh, and then shaped into disks having a diameter of 10.0 mm and a thickness of 0.5 mm under a pressure of 750 to 2000 kg/cm$^2$ by a hydraulic press. The disks are piled up while adding zirconia powder between disks, and calcined in air at 1150° C. for 2 hours, and then fired in a reducing atmosphere consisting of 10 vol% hydrogen and 90 vol% nitrogen at 1380° to 1430°0 C. for 2 hours to produce semiconductor ceramics of strontium titanate system.

The thus obtained semiconductor ceramic disks having a diameter of 8 mm and a thickness of 0.4 mm have applied on their surfaces paste consisting of 45 wt % of bismuth oxide, 5 wt % of copper oxide and 50 wt % of varnish. The amount of the paste is about 10 mg. The disks are then heat-treated in air at 1150° C. for 1 hour to form an insulating layer on the crystal grains of the semiconductor ceramics. Silver paste is then applied on both sides thereof, and baked at 800° C. for 30 minutes to finish a boundary layer ceramic capacitor.

The finished capacitors are subjected to measurement of apparent permittivity ($\epsilon$), dielectric loss (tan $\delta$), insulating resistance (IR), breakdown voltage (BDV) and percent non-defective. The results obtained are shown in Table 1. In the table, an asterisk (*) designates a specimen of which a composition is out of the compositional range of the present invention.

The measurements of apparent permittivity and dielectric loss were carried out at 25° C. by applying an alternating current of 1 KHz under 0.3 volts. The insulating resistance was measured at 30 seconds after applying a DC voltage of 50 V per unit thickness (mm) to the specimen at 25° C. The breakdown voltage is the lower limit value of the voltage at which the current flowing through the capacitor begins to abruptly increase during increasing the applied DC voltage at 25° C. The percent non-defective is obtained from 1000 disks for each composition. In this case, specimens which are separated into individuals by applying light mechanical vibration are judged as "good", and specimens which are separated by driving a razoredge between piled disks are judged as "no-good".

From the results in Table 1, it can be seen that the semiconductor ceramic compositions of the present invention make it possible to produce boundary layer ceramic capacitors having excellent electric properties, i.e., large apparent permittivity and high breakdown voltage characteristic at high percent non-defective. In addition, the semiconductor ceramic composition of the present invention have the advantages that they scarcely weld together during the firing process and are processed with ease even in the mass-production.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What we claim is:

1. A semiconductor ceramic boundary layer capacitor comprising a shaped ceramic semiconductor having insulating grain boundary layers on crystal grains of said shaped semiconductor formed by firing a shaped semiconductor ceramic composition in a neutral or reducing atmosphere and then heat treating said shaped semiconductor ceramic composition in an oxidizing atmosphere to form said insulating grain boundary layers wherein said semiconductor ceramic composition consists essentially of 99.90 to 99.995 weight % of a semiconductor ceramic component and 0.005 to 0.1 weight % of phosphorus, said semiconductor ceramic component consisting essentially of a solid solution of strontium titanate or modified strontium titanate having a composition expressed by the general formula:

$$(Sr_{1-x}A_x)(Ti_{1-y}Zr_y)O_3$$

wherein A is Ba or Ca, and x and y are mole fractions of the respective components and take respective values in the following ranges, $0 \leq x \leq 0.20$, $0 \leq y \leq 0.20$, and at least one semiconductorizing agent selected from the group consisting of Sb, Ta, Nb, W, Y, La and rare earth elements, said semiconductorizing agent being present in an amount sufficient to semiconductorize the solid solution but not more than 5 weight %, and wherein

TABLE 1

| | Composition (wt %) | | | | Electrical properties | | | | |
|---|---|---|---|---|---|---|---|---|---|
| | Semiconductor ceramic component | | | | | | | | Percent |
| Specimen | | doping | additive | | | | | | non-defective |
| No. | Basic component | element | P | Cu | $\epsilon$ | tan$\delta$(%) | IR(M$\Omega$) | BDV(V) | (%) |
| 1* | SrTiO$_3$ = 99.8 | Y = 0.2 | 0 | — | 55000 | 0.60 | 2700 | 240 | 66 |
| 2* | SrTiO$_3$ = 99.799 | W = 0.2 | 0.001 | — | 57000 | 0.54 | 4200 | 300 | 67 |
| 3 | SrTiO$_3$ = 99.795 | Y = 0.2 | 0.005 | — | 63000 | 0.55 | 3500 | 300 | 93 |
| 4 | SrTiO$_3$ = 99.79 | Ce = 0.2 | 0.01 | — | 53000 | 0.58 | 3000 | 380 | 95 |
| 5 | SrTiO$_3$ = 99.79 | Y = 0.2 | 0.01 | — | 54000 | 0.50 | 4200 | 380 | 94 |
| 6 | SrTiO$_3$ = 89.79 BaTiO$_3$ = 10.0 | Y = 0.2 | 0.01 | — | 57000 | 0.61 | 4000 | 360 | 96 |
| 7 | SrTiO$_3$ = 89.75 CaTiO$_3$ = 10.0 | Y = 0.2 | 0.05 | — | 51000 | 0.44 | 4500 | 400 | 95 |
| 8 | SrTiO$_3$ = 94.7 BaZrO$_3$ = 5.0 | Y = 0.2 | 0.1 | — | 49000 | 0.43 | 3800 | 400 | 97 |
| 9 | SrTiO$_3$ = 99.6 | Y = 0.2 | 0.2 | — | 32000 | 0.57 | 8500 | 460 | 96 |
| 10* | SrTiO$_3$ = 99.789 | W = 0.2 | 0.001 | 0.01 | 58000 | 0.62 | 2600 | 255 | 69 |
| 11 | SrTiO$_3$ = 99.78 | Y = 0.2 | 0.005 | 0.015 | 61000 | 0.59 | 3000 | 320 | 93 |
| 12 | SrTiO$_3$ = 99.76 | Ce = 0.2 | 0.01 | 0.03 | 57000 | 0.55 | 4400 | 380 | 95 |
| 13 | SrTiO$_3$ = 99.81 | Y = 0.15 | 0.01 | 0.03 | 60000 | 0.53 | 4000 | 375 | 97 |
| 14 | SrTiO$_3$ = 94.76 BaTiO$_3$ = 5 | Y = 0.2 | 0.01 | 0.03 | 61000 | 0.70 | 3800 | 360 | 96 |
| 15 | SrTiO$_3$ = 94.45 CaTiO$_3$ = 5 | Y = 0.25 | 0.05 | 0.25 | 52000 | 0.36 | 9500 | 430 | 98 |
| 16 | SrTiO$_3$ = 94.4 BaZrO$_3$ = 5 | Y = 0.2 | 0.1 | 0.3 | 49000 | 0.41 | 8800 | 430 | 98 |
| 17* | SrTiO$_3$ = 99.15 | Y = 0.2 | 0.2 | 0.45 | 32000 | 0.45 | 16000 | 420 | 91 | said insulating grain boundary layers formed as a result of the heat treating of said shaped semiconductor ceramic composition are formed from at least one member selected from the group consisting of V, Cr, Mn, Fe, Co, Ni, As, Sb, Tl, Bi and their oxides, said boundary layer capacitor having a permittivity of from 32,000 to 63,000 and a dielectric loss of from 0.36 to 0.70%.

2. The semiconductor ceramic boundary layer capacitor as disclosed in claim 1 wherein said semiconductor ceramic composition further includes 0.015 to 0.3 weight % of copper.

3. The semiconductor ceramic boundary layer capacitor as disclosed in claim 2 further including baked metallic silver on either side of said shaped semiconductor ceramic composition.

4. The semiconductor ceramic boundary layer capacitor as disclosed in claim 1 further including a metallic silver baked on either side of said shaped semiconductor.

* * * * *